United States Patent
Inoue

(10) Patent No.: US 7,300,076 B2
(45) Date of Patent: Nov. 27, 2007

(54) PIPE JOINT

(75) Inventor: Hiroshi Inoue, 1012-1, Amano-cho, Kawachinagano-shi, Osaka (JP)

(73) Assignees: Higashio Mech Co., Ltd., Kawachinagano-shi (JP); Hiroshi Inoue, Kawachinagano-shi (JP)

( * ) Notice: Subject to any disclaimer, the term of this patent is extended or adjusted under 35 U.S.C. 154(b) by 57 days.

(21) Appl. No.: 11/229,692

(22) Filed: Sep. 20, 2005

(65) Prior Publication Data
US 2006/0066099 A1   Mar. 30, 2006

(30) Foreign Application Priority Data
Sep. 29, 2004   (JP) .............................. 2004-282889

(51) Int. Cl.
*F16L 33/00* (2006.01)

(52) U.S. Cl. ........................ 285/248; 285/389; 285/249

(58) Field of Classification Search ................ 285/248, 285/246, 389
See application file for complete search history.

(56) References Cited

U.S. PATENT DOCUMENTS

| | | | | |
|---|---|---|---|---|
| 2,283,975 A | * | 5/1942 | Dillon | 285/104 |
| 2,570,224 A | * | 10/1951 | Fason | 285/382.7 |
| 2,628,111 A | * | 2/1953 | Smalline | 285/310 |
| 3,653,688 A | * | 4/1972 | Sakakibara | 285/105 |
| 4,223,919 A | * | 9/1980 | Kurachi | 285/8 |
| 4,606,564 A | * | 8/1986 | Kurachi | 285/248 |

FOREIGN PATENT DOCUMENTS

| | | | | |
|---|---|---|---|---|
| JP | 262498 | * | 3/1990 | 285/248 |
| JP | 3122385 | | 10/2000 | |
| JP | 3122385 | | 10/2002 | |

* cited by examiner

*Primary Examiner*—David Bochna
(74) *Attorney, Agent, or Firm*—Kratz, Quintos & Hanson, LLP

(57) ABSTRACT

A pipe joint provided with a joint main body having a male screw portion and a cap nut screwed on the male screw portion of the joint main body. And, the pipe joint has an outer-fitting cylinder portion and an insertion cylinder portion holding an end portion of an elastically deformable connected pipe on inner and outer sides. And, a C-shaped stop ring, having a slit on its periphery and disposed within a tapered portion of a hole portion of the cap nut, is provided. The stop ring has a holding female portion formed through an inner peripheral face and a peripheral face of the stop ring. A rotator, held within the holding female portion as to rotate, touching the tapered portion of the hole portion of the cap nut, elastically forming a peripheral concave groove on a peripheral face of the pipe, and deforming the end portion of the pipe into a tapered portion increasing in diameter, is provided.

5 Claims, 13 Drawing Sheets

PIPE JOINT

BACKGROUND OF THE INVENTION

1. Field of the Invention

This invention relates to a pipe joint.

2. Description of the Related Art

A conventional pipe joint, in which a male screw portion of a retainer is screwed into a tapered female screw portion of a joint main body to make outer peak portions of plural small discs, protruding from an inner peripheral face of the retainer, bite into a peripheral face of a pipe as not to be drawn out in an axis direction, is known (refer to Japanese patent No. 3122385).

In this conventional pipe joint, very high fastening force is required to screw the retainer into the joint main body and working efficiency is low because the small discs spirally and gradually bite into the peripheral face of the pipe. Further, when high drawing force works on the pipe after the connection, the retainer may be drawn out leaving scratches in a longitudinal direction on the peripheral face of the pipe, or the small discs may be damaged and the pipe falls out because of the construction in which the drawing is stopped by the plural small discs biting into the peripheral face of the pipe.

It is therefore an object of the present invention to provide a pipe joint, with which connection of the pipe is made by fastening without large force, and the pipe is certainly and firmly fixed connected with high stopping power against drawing of the pipe.

BRIEF DESCRIPTION OF THE DRAWINGS

The present invention will be described with reference to the accompanying drawings, in which.

DESCRIPTION OF THE PREFERRED EMBODIMENTS

Figure 1:
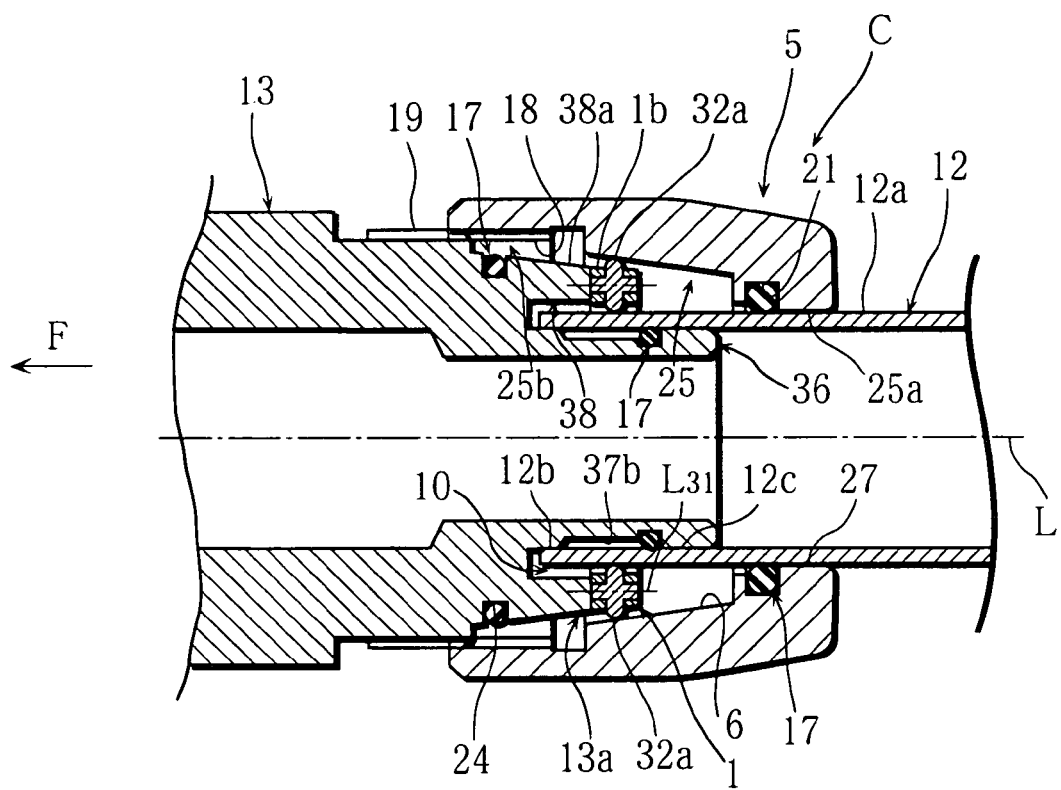
FIG. 1 is a cross-sectional side view showing an embodiment of a pipe joint relating to the present invention.

Preferred embodiments of the present invention will now be described with reference to the accompanying drawings.

FIG. 1 through FIG. 9 show an embodiment of a pipe joint relating to the present invention. As shown in these figures, a pipe joint C is provided with a joint main body 13 having a male screw portion 19 and a cap nut 5 screwed on the male screw portion 19.

Concretely, the cap nut 5 has a hole portion 25 to which a pipe 12 (to be connected) is inserted, and the hole portion 25 is composed of an insertion hole portion 27 formed on a rear side 25a of the cap nut 5 and the pipe 12 is inserted to, a circular holding groove portion 21 formed on a middle position between front and rear portions of the insertion hole portion 27 and holding a seal member 17 fit to a peripheral face 12a of the pipe 12, a tapered portion 6 formed as to increase forward in diameter from the insertion hole portion 27, and a female screw portion 18 formed on a front side 25b of the hole portion 25 and screwed on the male screw portion 19 of the joint main body 13.

A direction, in an axis L direction of the pipe 12, in which the cap nut 5 is screwed to the joint main body 13, is defined as a forward direction F.

And, the pipe 12 is composed of a plastically-deformable material such as stainless steel or other metals.

Next, the joint main body 13 has an outer-fitting cylinder portion 38 and an insertion cylinder portion 36 to which an end portion 12b of the pipe 12 is inserted and held from outside and inside.

Concretely, a peripheral face 37 of the insertion cylinder portion 36 has a pipe insertion portion 37a formed on the rear side and slightly tapered to facilitate the insertion of the pipe 12, a peripheral groove 37b formed on the front end of the pipe insertion portion 37a and making an inner peripheral face 12c of the pipe 12, when a peripheral concave groove 4 is elastically formed on the pipe 12, diminish inward in diameter direction as to correspond to the peripheral concave groove 4 (as described later), and a rotation-stopping tapered portion 37c extended as to be slightly tapered forward with a peripheral staged portion 40 on the front end of the peripheral groove 37b.

Further, a circular holding groove portion 20 is formed between the pipe insertion portion 37a and the peripheral groove 37b on the peripheral face 37, and a seal member 17, fitting to the inner peripheral face 12c of the pipe 12, is held in the holding groove portion 20.

Or, although not shown in Figures, the peripheral groove 37b may be formed deeper (than that shown in Figures) instead of the holding groove portion 20, and the seal member 17 may be held on the rear end of the peripheral groove 37b. In this case, the seal member 17 contacts a staged wall portion connecting a portion around the rear end of the peripheral groove 37b and a portion around the front end of the pipe insertion portion 37a.

Next, the outer-fitting cylinder portion 38 has a tapered outer face portion 38a, which contacts the tapered portion 6 of the cap nut 5 when screwing of the cap nut is completed, on the peripheral face, and a pressing rear end face 38b, at right angles with the axis L of the pipe 12, on a rear end of the tapered outer face portion 38*a*. And, an inner peripheral face 38*c* is formed forward from an inner peripheral end of the pressing rear end face 38*b*, and the inner peripheral face 38*c* forms a gap 10, in which the end portion 12*b* can be deformed into a tapered portion 15 widening forward, with the end portion 12*b* of the pipe 12. The pressing rear end face 38*b*, disposed on a position corresponding to a middle portion of the peripheral groove 37*b* of the peripheral face 37 of the insertion cylinder portion 36, contacts the stop ring 1 (as described later).

And, a circular holding groove portion 24 is formed on a front portion of the tapered outer face portion 38*a* of the outer-fitting cylinder portion 38, and the seal member 17, fitting to the hole portion 25 of the cap nut 5 when screwed, is held in the holding groove portion 24.

And, (in FIG. 1 and FIG. 2) although only a part of the joint main body 13 is shown (in cross section), the whole joint main body 13 may be various types such as straight, elbow, tee, socket, etc. Further, (described later with FIG. 11 and FIG. 12) another joint of similar construction may be detachably attached to another end side (the forward direction F side) out of Figures in an opposite direction to the axis L direction.

The joint main body 13 and the cap nut 5 are composed of stainless steel, etc.

Further, the pipe joint C is provided with a C-shaped stop ring 1 having an opening 1*a* on its periphery and disposed in the tapered portion 6 of the hole portion 25 of the cap nut 5. The peripheral face 1*b* of the stop ring 1 is formed tapered (diminishing from the front side to the rear side) with the same inclination angle with the tapered portion 6 of the cap nut 5.

The stop ring 1 is preferably composed of a material, which generates no electrocorrosion when in contact with the inserted pipe 12, the joint main body 13, and the cap nut 5, such as CAC406C (gun metal).

In the stop ring 1, a first holding female portion 31 is formed near an end 2 of the opening 1*a*, and a second holding female portion 31 is formed on a symmetric position to the first holding female portion 31 with respect to an imaginary center point O of the stop ring 1. The forward side when the stop ring 1 is screwed around the pipe 12 as shown with an arrow $M_1$ is the end 2, and an opposite side is another end 22.

Concretely, the holding female portion 31 is composed of a discoid large spaced portion 31*a* formed on a middle position of the stop ring 1 as a hollow from the inner peripheral face 1*c* side to the peripheral face 1*b*, and a small hole portion 31*b* formed through the stop ring 1 in an axis $L_{31}$ direction parallel to the axis L of the pipe 12 and connected to the large spaced portion 31*a*.

A rotator 32 is held within each of the holding female portions 31 of the stop ring 1 as to rotate around the axis $L_{31}$ parallel to the axis L of the pipe 12.

Concretely, the rotator 32 is composed of an axle portion 32*b* of short cylinder held by the small hole portion 31*b*, and a disc portion 32*a* disposed on a central position between front and rear of the axle portion 32*b* and held as to freely rotate within the large spaced portion 31*a* of the holding female portions 31. A peripheral portion of the disc portion 32*a* is formed half-circular (curved) in longitudinal cross section, and a hitching convex ridge 33 on the inner peripheral face 1*c* of the stop ring 1 certainly hitches onto the concave groove 4 formed on the peripheral face 12*a* of the pipe 12.

The rotator 32 is preferably composed of a material which generates no electrocorrosion with the stop ring 1 and the pipe 12, and has high strength.

Further, in the stop ring 1, the hitching convex ridge 33, to hitch onto the concave groove formed on the peripheral face 12*a* of the pipe 12, is formed from the end 2 to the other end 22 on (a central position in longitudinal direction of) the inner peripheral face 1*c*. An inner peripheral portion of the hitching convex ridge 33 is rectangular protrusion in longitudinal cross section.

Figure 9:
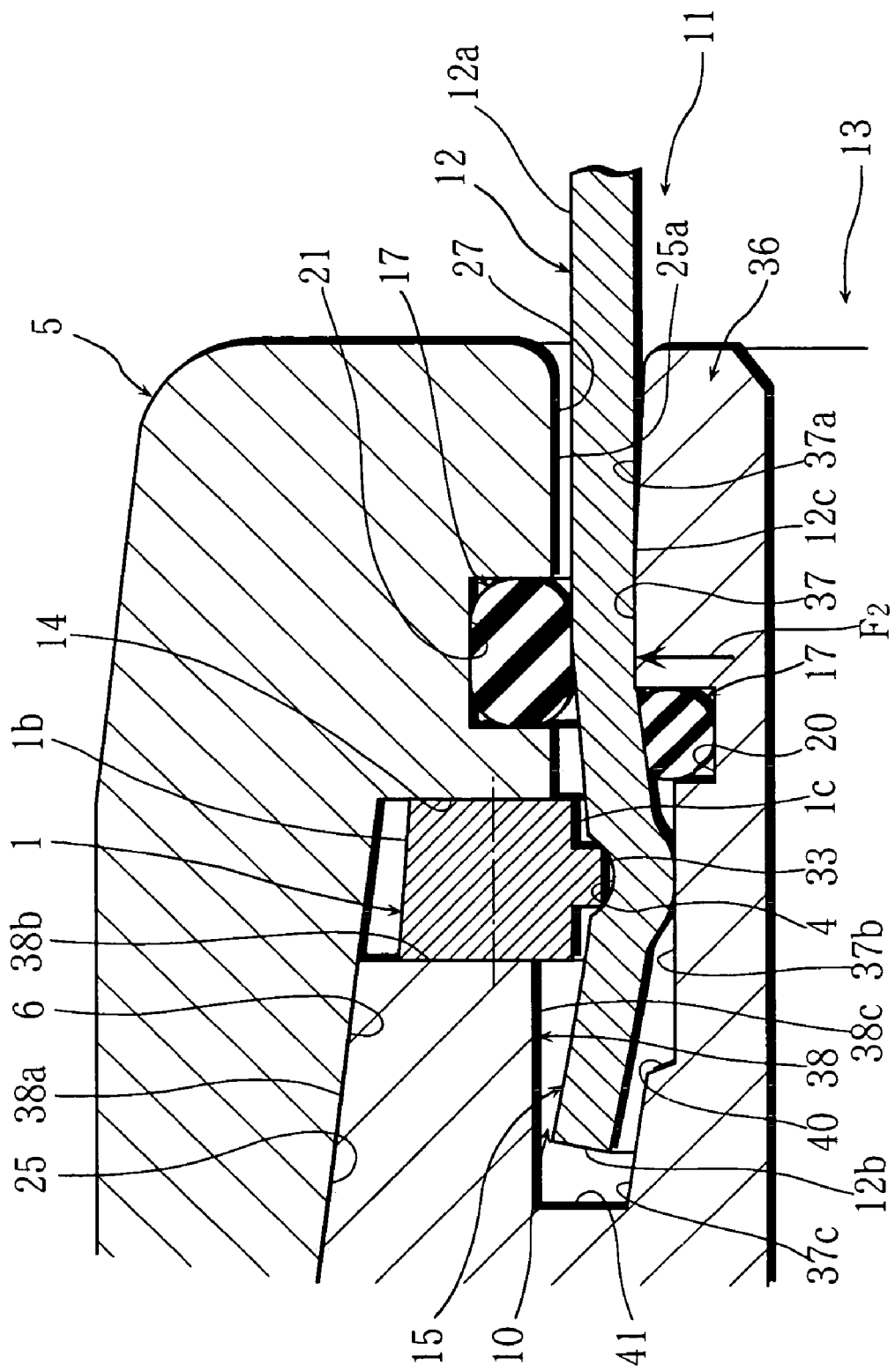
FIG. 9 is an enlarged cross-sectional side view of a principal portion.
Figure 10:
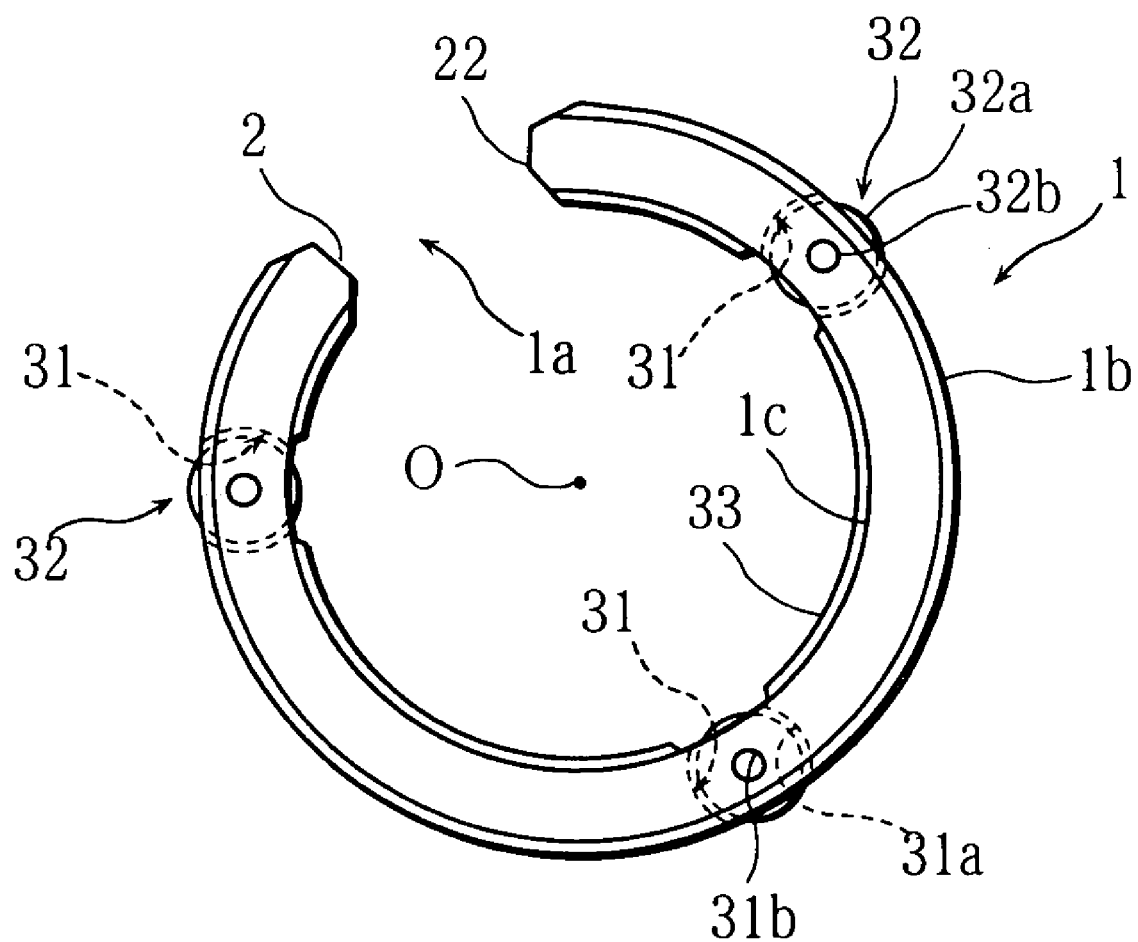
FIG. 10 is an enlarged front view showing another embodiment of the stop ring.

FIG. 10 shows a modification of the stop ring 1 in which the stop ring 1 has three holding female portions 31, and the rotator 32 is held in each of the holding female portions 31. Concretely, the three holding female portions 31 are disposed between the end 2 and the other end 22 of the stop ring 1 with the same intervals on the periphery. The holding female portions 31 and the rotator 32 are similarly constructed as described with FIGS. 1 through 9. Further, although not shown in Figures, 4 or more holding female portions 31 may be disposed on the periphery with the same intervals on the periphery, and the rotator may be held in each of the holding female portions 31.

Figure 11:
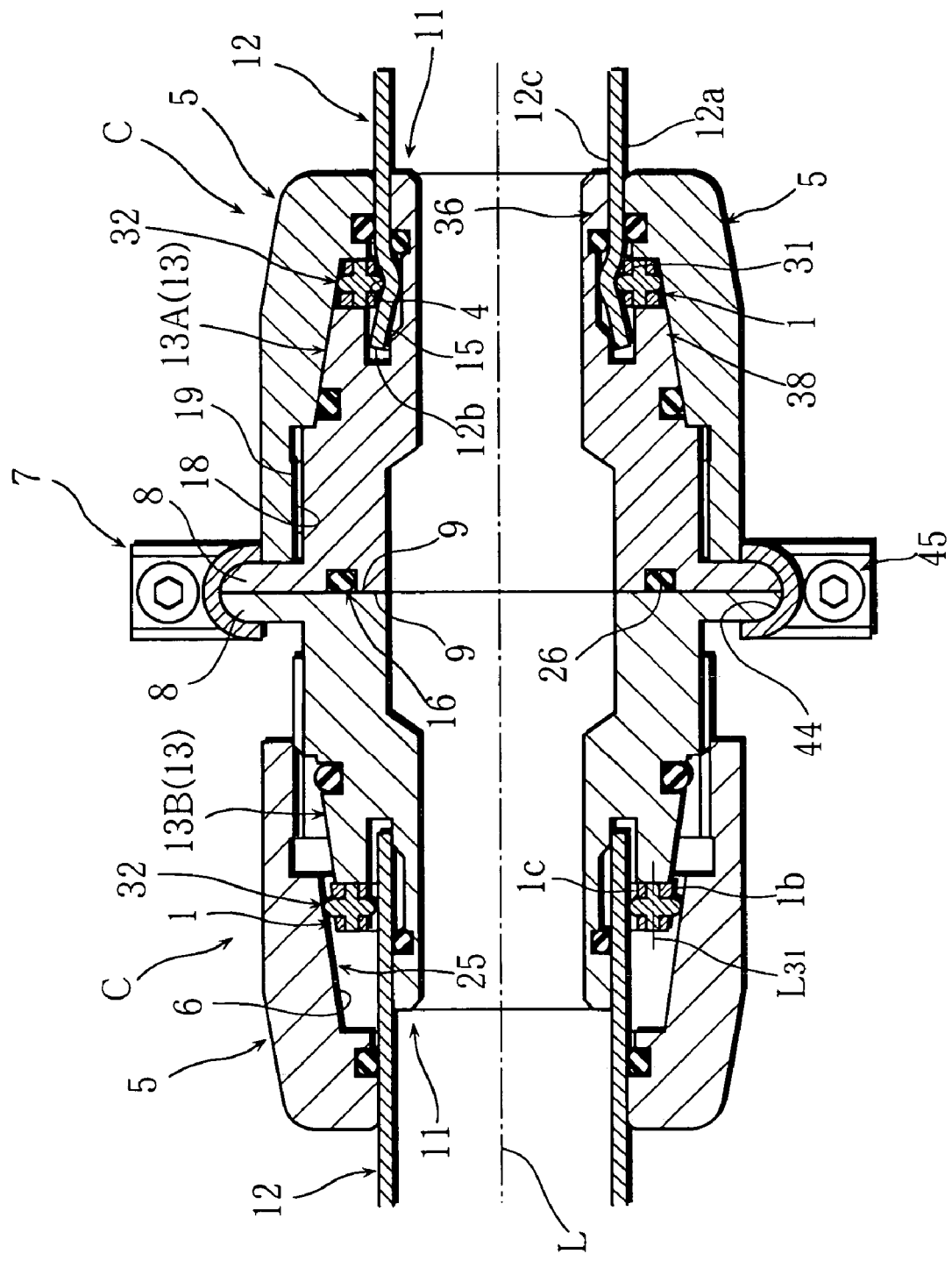
FIG. 11 is a cross-sectional side view showing operation method of the pipe joint.
Figure 12:
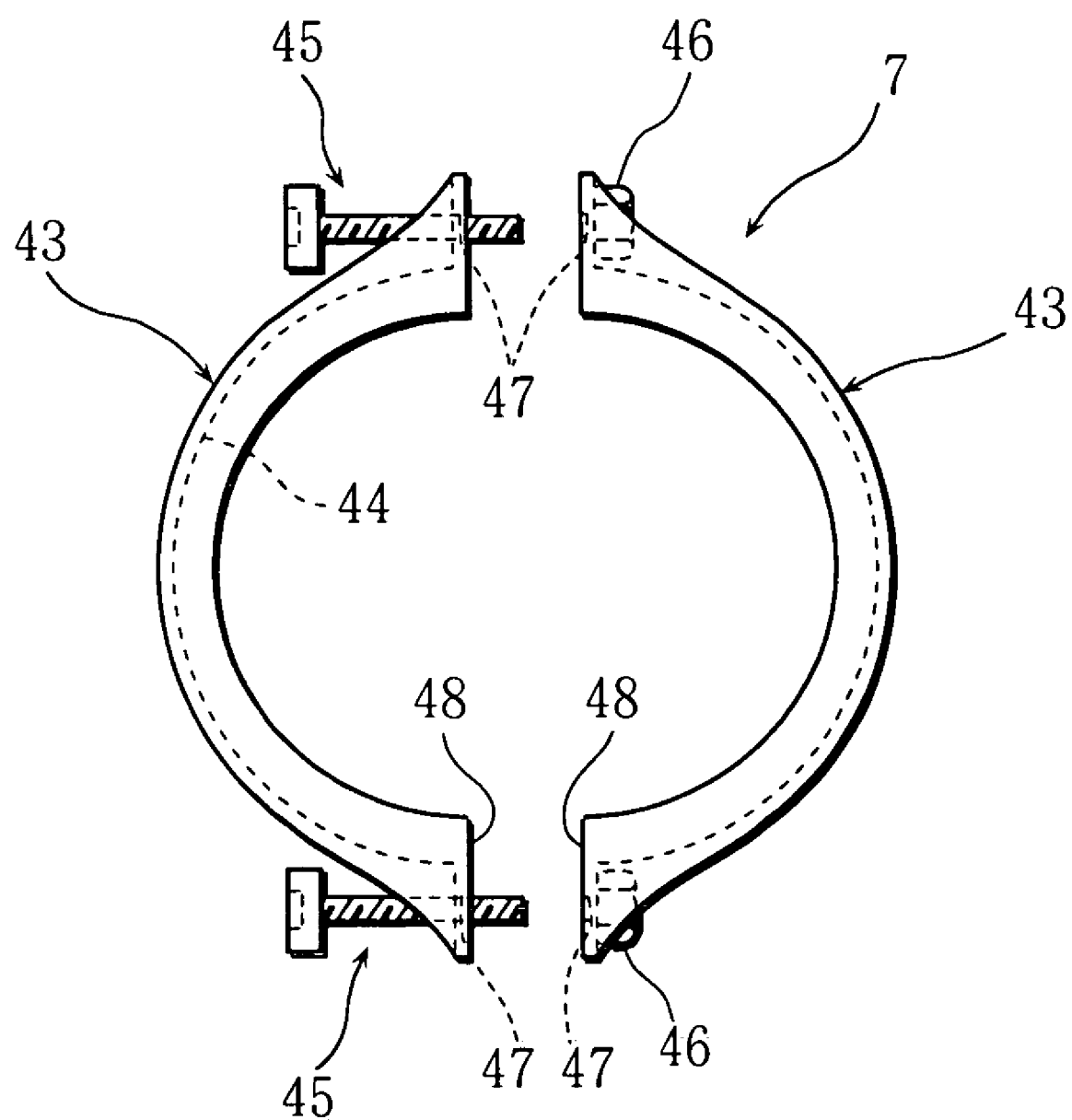
FIG. 12 is an enlarged front view of a principal portion showing a fastening ring body.

And, as shown in FIG. 11 and FIG. 12, two pipe joints C as one pair are united as to place the pipe insertion portions 11 opposite each other.

Concretely, the joint main body 13 of each of the pipe joints C has an outer brim portion 8 and a flat mating end face 9 at right angles with the axis L of the pipe 12 is formed on an opposite side of the pipe insertion portion 11 (composed of the insertion cylinder portion 36 and the outer-fitting cylinder portion 38).

And, the outer brim portions 8 of one pair of joint main bodies 13A and 13B are detachably fastened by the fastening ring body 7 with the mating end faces 9 tightly fit each other.

To describe concretely further, the fastening ring body 7 is composed of one pair of half ring bodies 43 of half circle, screw holes 47 formed through mating faces 48 of both ends of each of the half ring bodies 43, two bolts 45 inserted to the screw holes 47, and nut portions 46, formed on both ends of one of the half ring bodies 43, to which the bolts 45 through the screw holes 47 are screwed.

A fastening concave groove 44 to hold the outer brim portion 8 is formed on an inner peripheral face of each of the half ring bodies 43, and the half ring body 43 has the mating face 48 on the both end sides.

The fastening ring body 7 is composed of stainless steel, etc.

Although not shown in Figures, one end of each of the half ring bodies 43 may be fixed, and the other end of each of the half ring bodies 43 may be connected with a bolt and a nut as to circularly fasten.

And, a circular holding groove portion 26 is formed on the mating end face 9 of the joint main body 13A, and a seal member 16, fitting to the mating end face 9 of the other joint main body 13B, is held by the holding groove portion 26.

Figure 13:
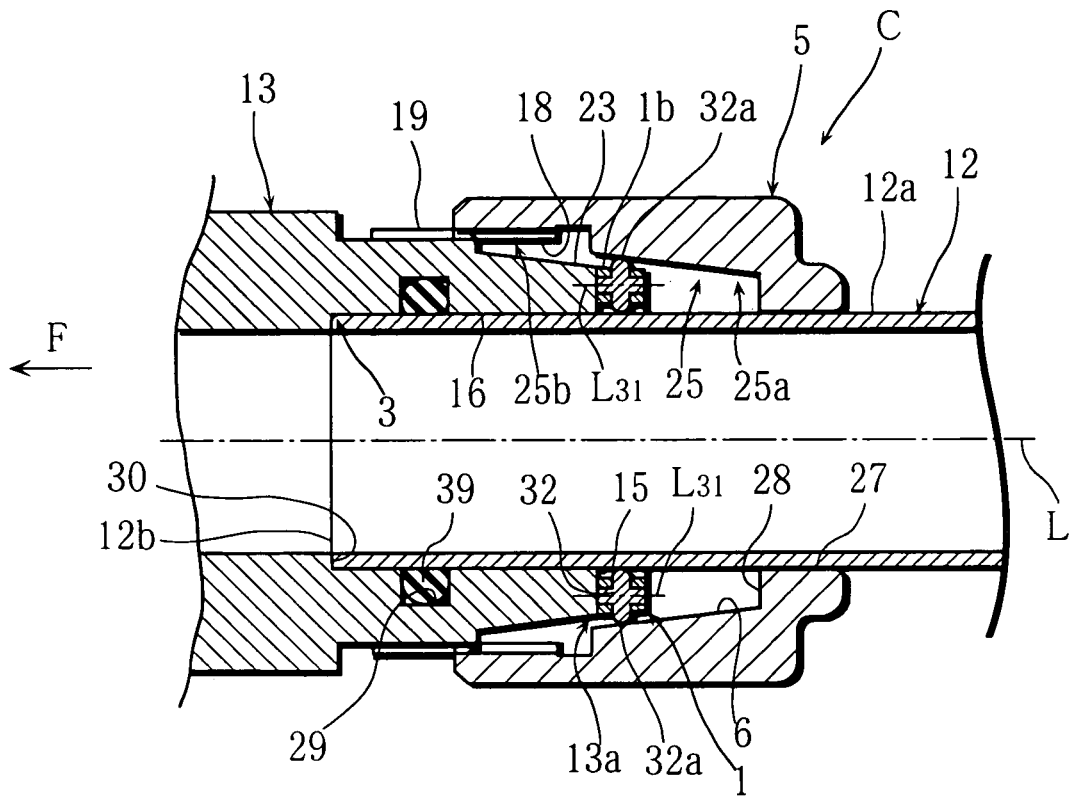
FIG. 13 is a cross-sectional side view showing another embodiment of the pipe joint relating to the present invention.
Figure 14:
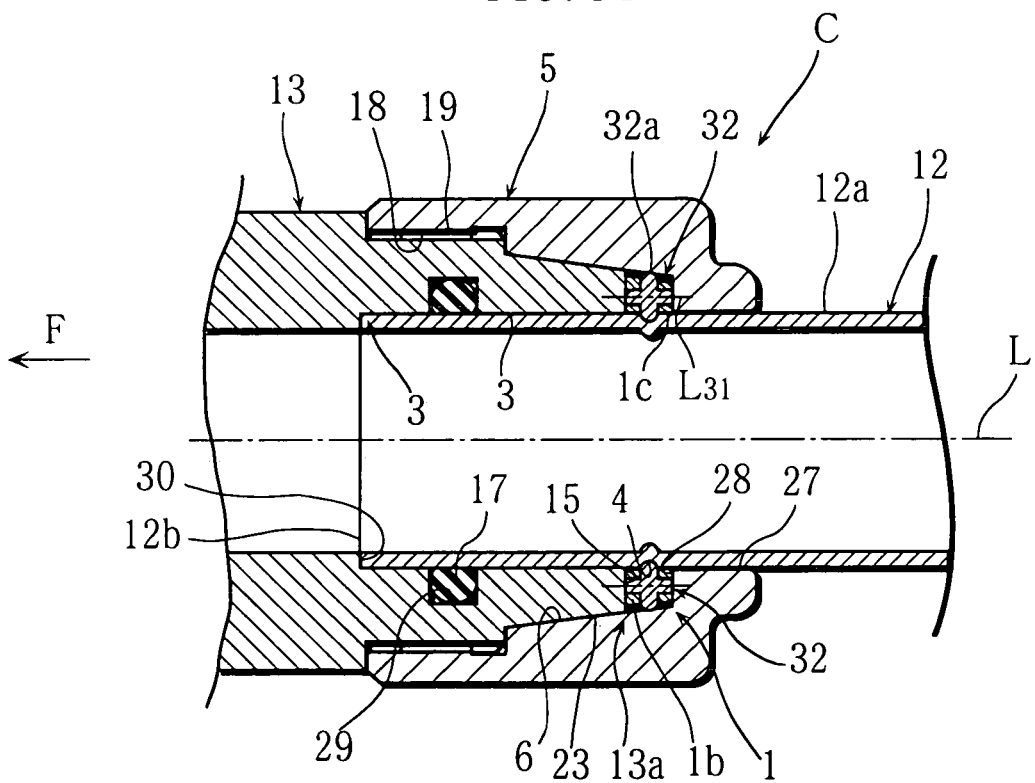
FIG. 14 is a cross-sectional side view.
Figure 15:
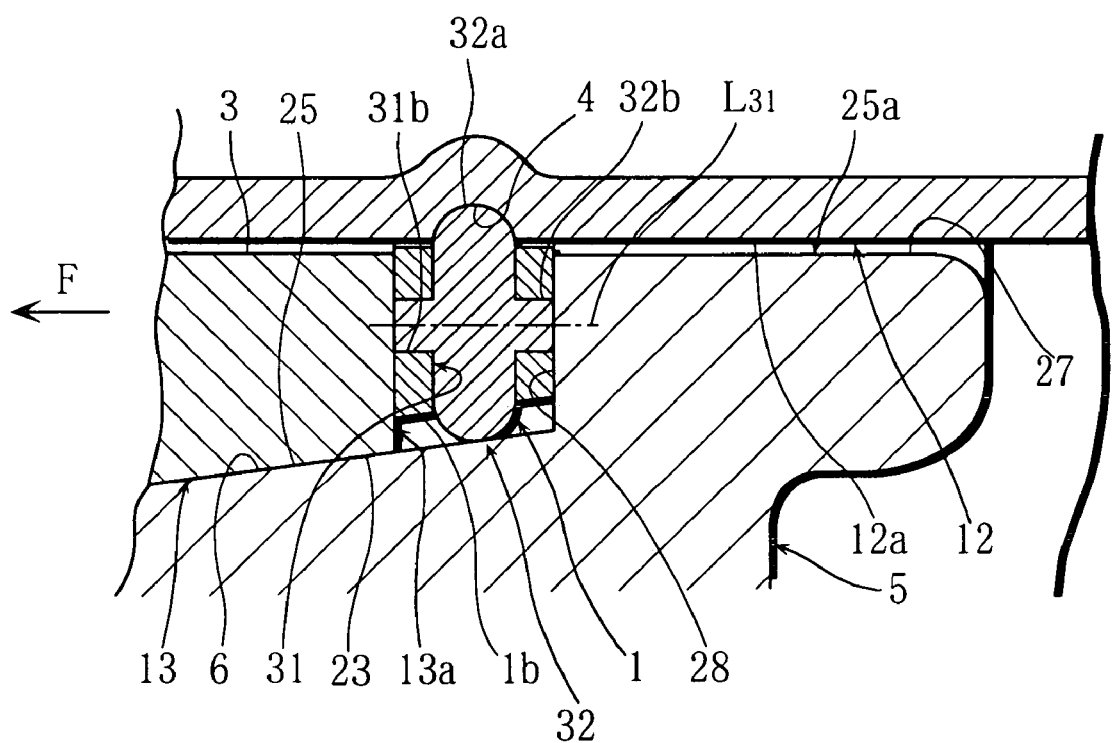
FIG. 15 is an enlarged cross-sectional side view of a principal port ion.

Next, FIGS. 13, 14, and 15 show another embodiment of the pipe joint relating to the present invention. This pipe joint C is provided with a joint main body 13 having a male screw portion 19 and a cap nut 5 screwed to the male screw portion 19, and the cap nut 5 is different from that of the pipe joint C of FIGS. 1 through 9 in a point that the circular holding groove portion 21 is not formed in the insertion hole portion 27 (therefore, the above-described seal member 17 is also not provided).

To describe concretely, the joint main body 13 has a hole portion 3, to which the pipe 12 is inserted, and a holding groove portion 29, holding a seal member 39 such as an O-ring, is formed on the hole portion 3. And, the joint main body 13 has a tapered peripheral face 23, which contacts the tapered portion 6 of the cap nut 5 when the screwing is completed, on a rear peripheral face.

And, in the hole portion 3, a peripheral stopping staged portion 30, which contacts the end (forth end) portion 12b of the inserted pipe 12, is formed on an inner portion 3a.

The stop ring 1 and the rotator 32 are similar to that of the pipe joint of FIGS. 1 through 9.

And, (in FIG. 13 and FIG. 14) although only a part of the joint main body 13 is shown, the whole joint main body 13 may be various types such as straight, elbow, tee, socket, etc. And, although not shown in Figures, the pipe joint C may be formed as described with FIG. 11 and FIG. 12, one pair of the pipe joints C may be united and detachably fastened by the fastening ring body 7.

Figure 16:
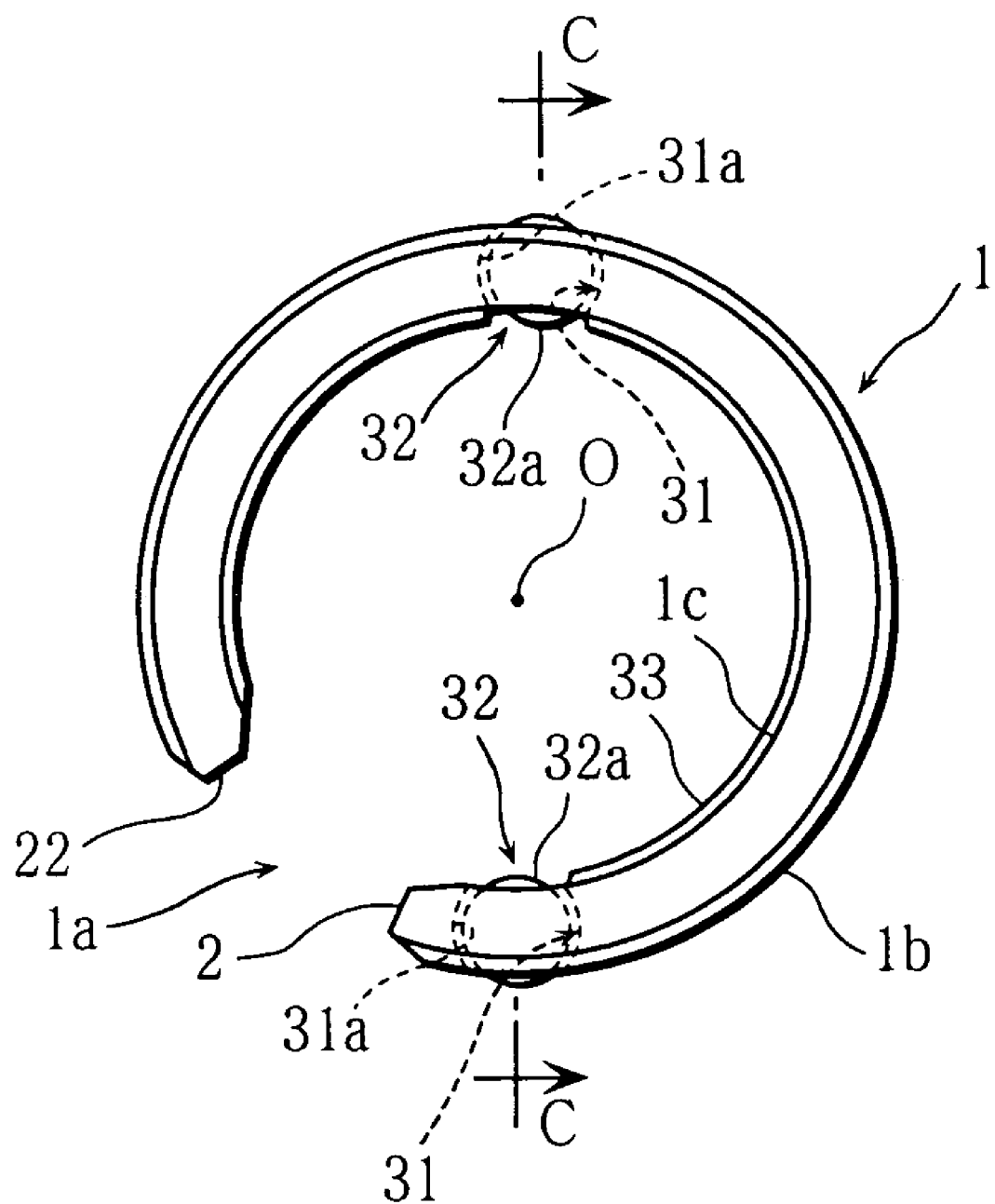
FIG. 16 is a cross-sectional side view showing a further embodiment of the stop ring.
Figure 17A:
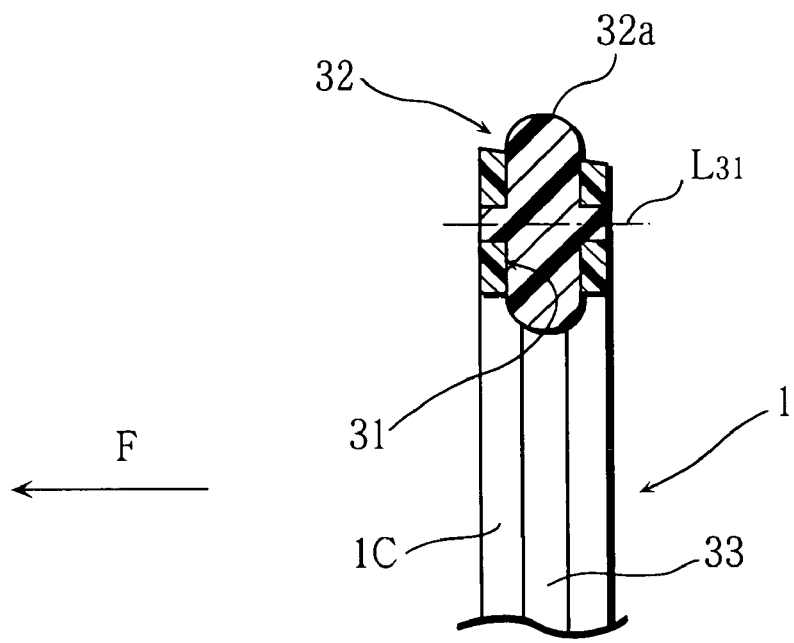
FIG. 17A is an enlarged cross-sectional view observed in arrows C-C direction of FIG. 16 showing an embodiment.
Figure 17B:
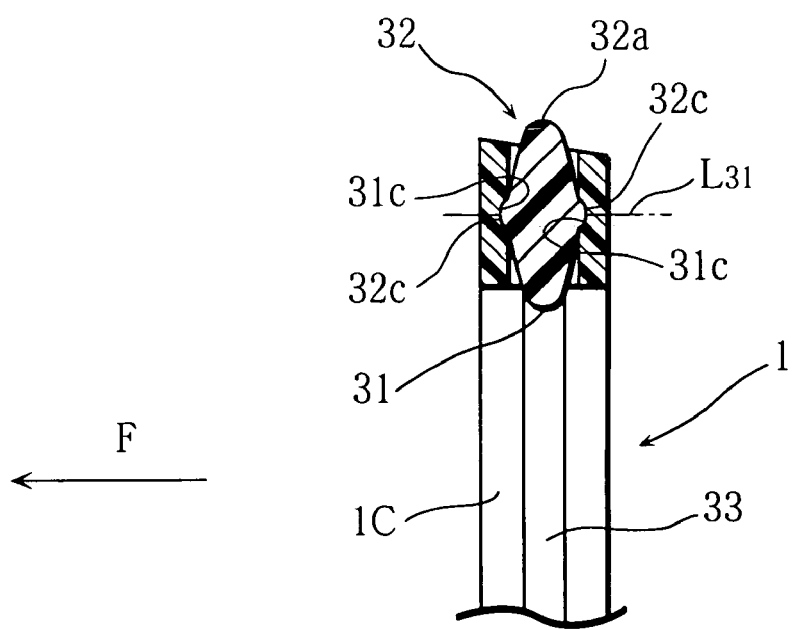
FIG. 17B is an enlarged cross-sectional view observed in arrows C-C direction of FIG. 16 showing another embodiment.

FIGS. 16 through 17B show another modification of the stop ring 1. This stop ring 1 is different from that shown in FIGS. 1 through 9 in a point that the holding female portion 31 is composed of only the large spaced portion 31a and not having the small hole portion 31b, and the rotator 32 is composed of only the disc portion 32a and not having the axle portion 32b.

To describe the stop ring 1 and the rotator 32 concretely further, as shown in FIG. 17A, the large spaced portion 31a is formed as mild curved protrusion (in other words, both wall portions of the stop ring 1 forming the spaced portion 31a are formed as mild curved concaves). And, both wall portions of the disc portion 32a of the rotator 32 are formed as mild curved protrusion, the rotator 32 is forcedly pressed into the large spaced portion 31a of the holding female portion 31 of the stop ring 1 and held as to rotate around an axis $L_{31}$ parallel to the axis L of the pipe 12 without sudden falling.

Or, different from FIGS. 17A, the holding female portion 31 in FIG. 17B has a pair of rotation concave portions 31c on the both wall portions of the stop ring 1 forming the spaced portion 31a and in the axis $L_{31}$ direction parallel to the axis L of the pipe 12. And, the rotator 32 has a pair of rotation convex portions 32c protruding from the both sides of the disc portion 32a and held by the rotation concave portions 31c of the holding female portion 31.

In case that the applied pipe 12 is made of soft metal such as aluminum, or a compound pipe in which a soft metal layer and a synthetic resin layer are layered, both of the stop ring 1 and the rotator 32 are preferably composed of synthetic resin. Naturally, it is possible to use the same materials mentioned with FIGS. 1 through 9.

Although not shown in Figures, the stop ring 1 and the rotator 32 can be freely modified. That is to say, the rotator 32, different from that shown in FIGS. 1 through 9, may have two front and rear disc portions 32a, and the stop ring 1 may have one pair of front and rear large spaced portions 31a and two front and rear hitching convex ridge portions 33.

Next, operation method and function of the above-described pipe joint are explained.

Figure 5:
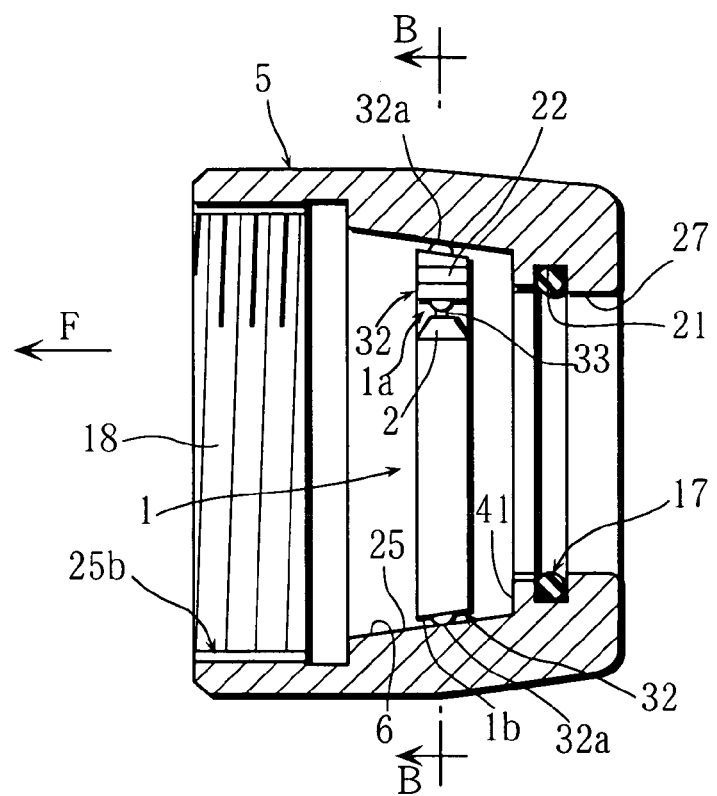
FIG. 5 is an enlarged side view with a partial cross section showing a cap nut and the stop ring.
Figure 6:
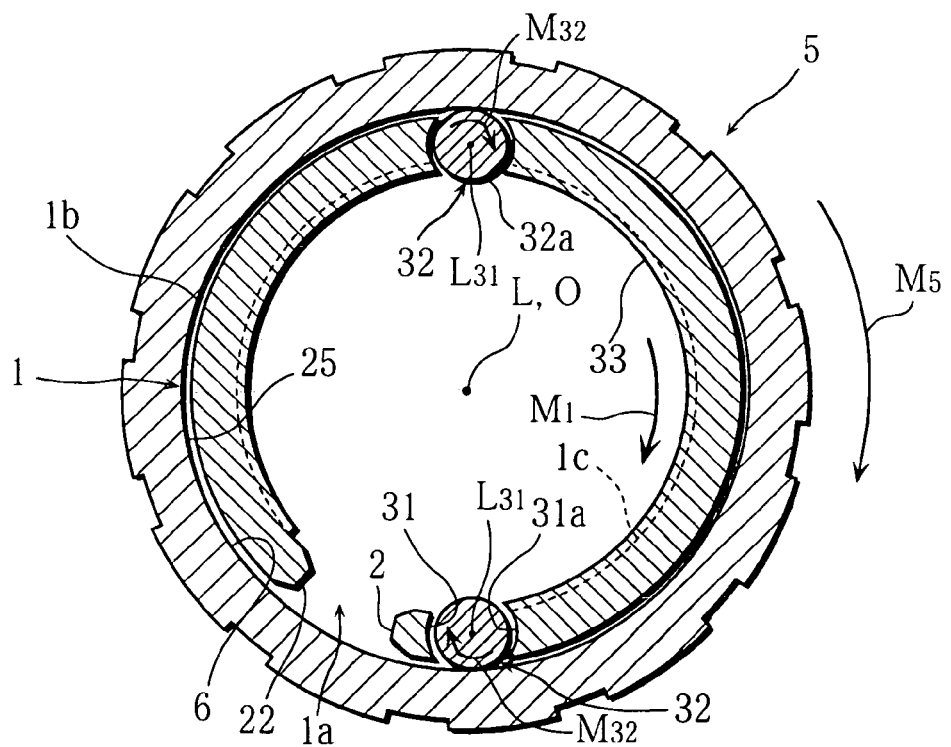
FIG. 6 is an enlarged cross-sectional view of B-B line in FIG. 5.

In FIGS. 1, 5, 6, and 7, firstly, the stop ring 1 is disposed in the tapered portion 6 of the hole portion 25 of the cap nut 5 to make the disc portion 32a of the rotator 32 contact the tapered portion 6 (refer to FIG. 5 and FIG. 6).

And, the pipe 12, fitting to the seal member 17 of the cap nut 5, is inserted to the insertion hole portion 27 and the inner peripheral face 1c of the stop ring 1. And, the pipe 12, kept fit to the seal member 17, is inserted to the pipe insertion portion 37a of the peripheral face 37 of the insertion cylinder portion 36 of the joint main body 13, and to the rotation-stopping tapered portion 37c to be hitched (refer to FIG. 1 and FIG. 7).

Then, a protection cover made of resin such as polypropelene (not shown in Figures) is attached to the mating end face 9 of the joint main body 13 (refer to FIG. 11), the protection cover is hit by a hammer backward in the axis L direction to firmly set and hitch the end portion 12b of the pipe 12 to the rotation-stopping tapered portion 37c of the joint main body 13. This operation firmly hitches the pipe 12 to the joint main body 13, and the inner peripheral face 12c of the pipe 12 receives strong hitching force shown with an arrow $F_1$ from the rotation-stopping tapered portion 37c. This hitching force $F_1$ firmly prevents the rotation of the pipe 12 to the joint main body 13 when screwing of the cap nut 5 begins.

Figure 7:
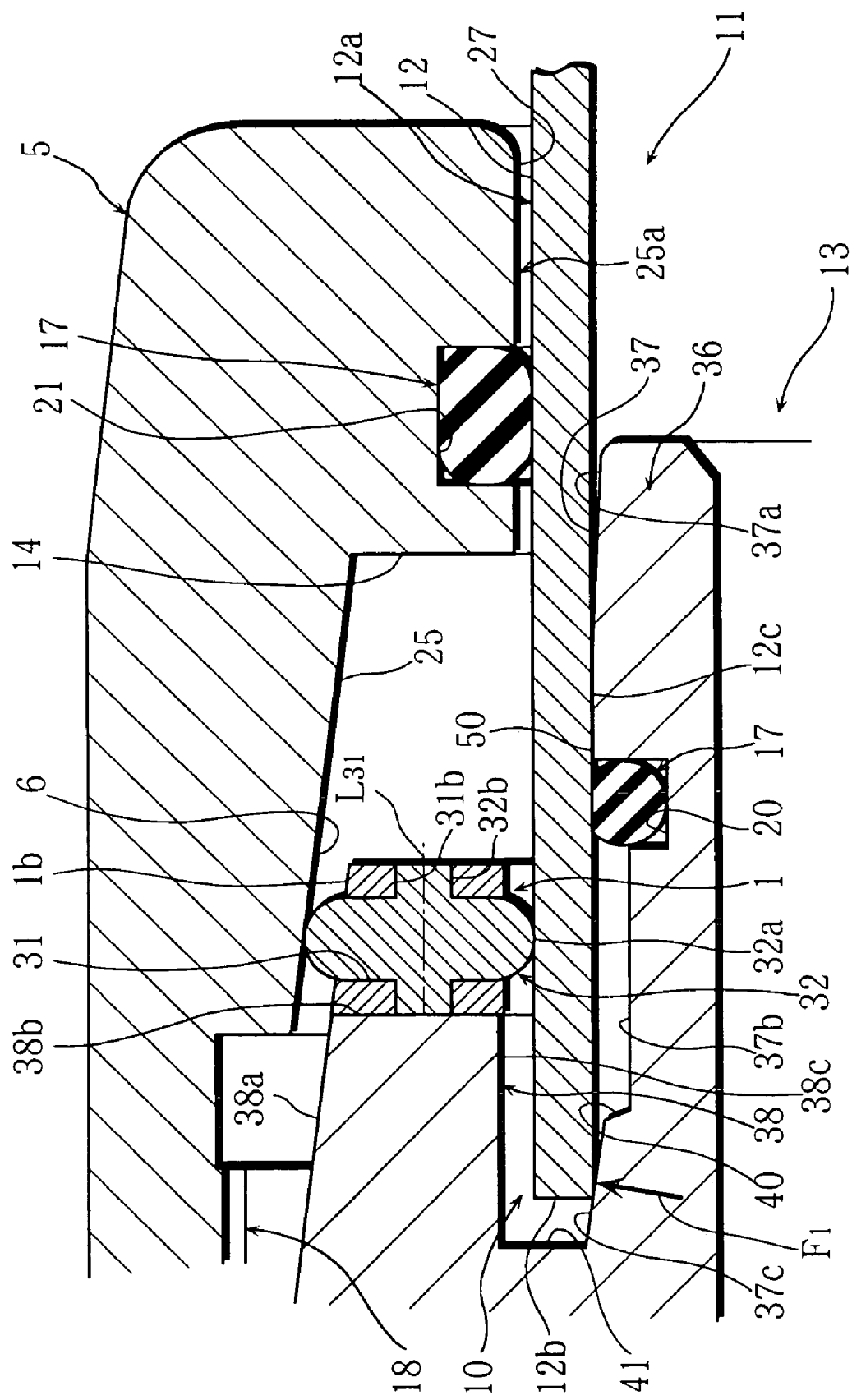
FIG. 7 is an enlarged cross-sectional side view of a principal portion.

Although the end portion 12b of the pipe 12 is inserted to a longitudinal middle position of the rotation-stopping tapered portion 37c in FIG. 1 and FIG. 7, the end portion 12b may be inserted further as to contact an inner wall portion 41 (continuing to the rotation-stopping tapered portion 37c and a forth end peripheral portion of the inner peripheral face 38c of the outer-fitting cylinder portion 38) of the joint main body 13.

Next, in FIGS. 1, 6, and 7, the cap nut 5 is screwed to the joint main body 13 in an arrow $M_5$ direction (rightward), the stop ring 1, touching a pressing rear end face 38b of the outer-fitting cylinder portion 38, rotates around a predetermined position on the peripheral face 12a of the pipe 12 in the arrow $M_1$ direction, the same direction of the arrow $M_5$. Simultaneously, the disc portion 32a of the rotator 32, rotating in an arrow $M_{32}$ direction which is the same direction of the arrow $M_5$, revolutes with sliding the tapered portion 6 of the cap nut 5 to the diminishing side (rear side). The rotation amount of the stop ring 1 is smaller than the rotation amount of the cap nut 5 as shown by the sizes of the arrows $M_1$ and $M_5$.

During the screwing, the pipe 12 does not rotate against the joint main body 13 restricted by the hitching force $F_1$.

The stop ring 1, rotating around the predetermined position on the pipe 12 in the arrow $M_1$ direction, gradually diminishes in diameter, and, the rotator 32, rotating around the axis $L_{31}$ in the arrow $M_{32}$ direction, forms the circular concave groove 4 on the predetermined position on the peripheral face 12a of the pipe 12 to gradually deform the end portion 12b into an opening taper.

Figure 2:
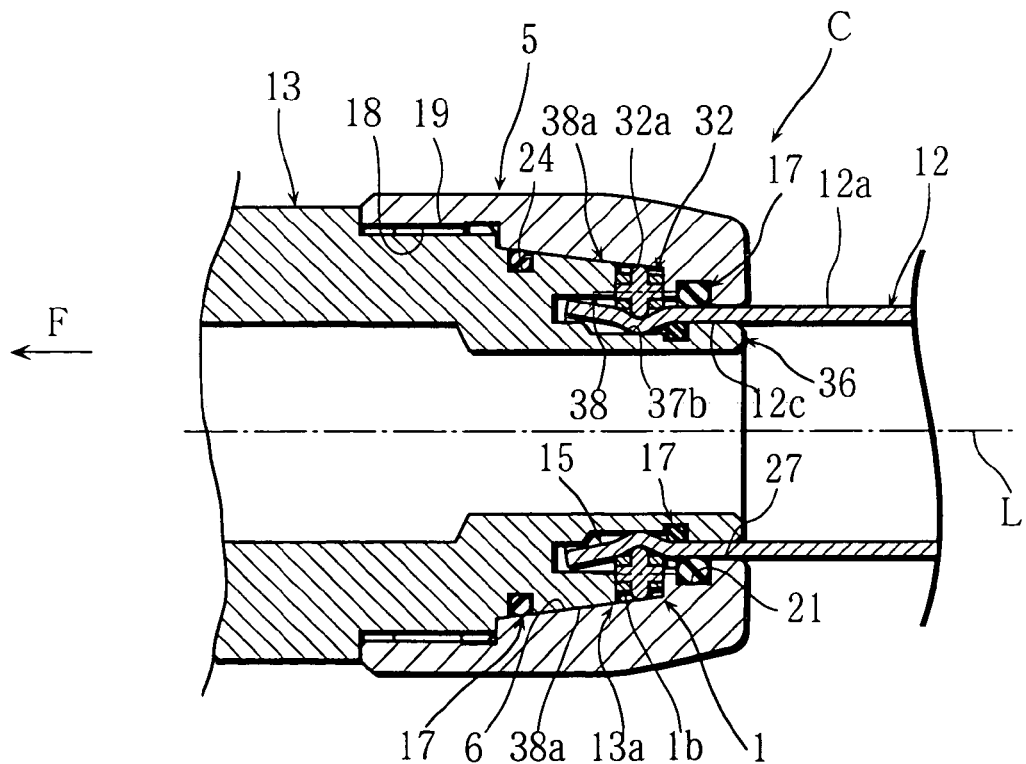
FIG. 2 is a cross-sectional side view.
Figure 3:
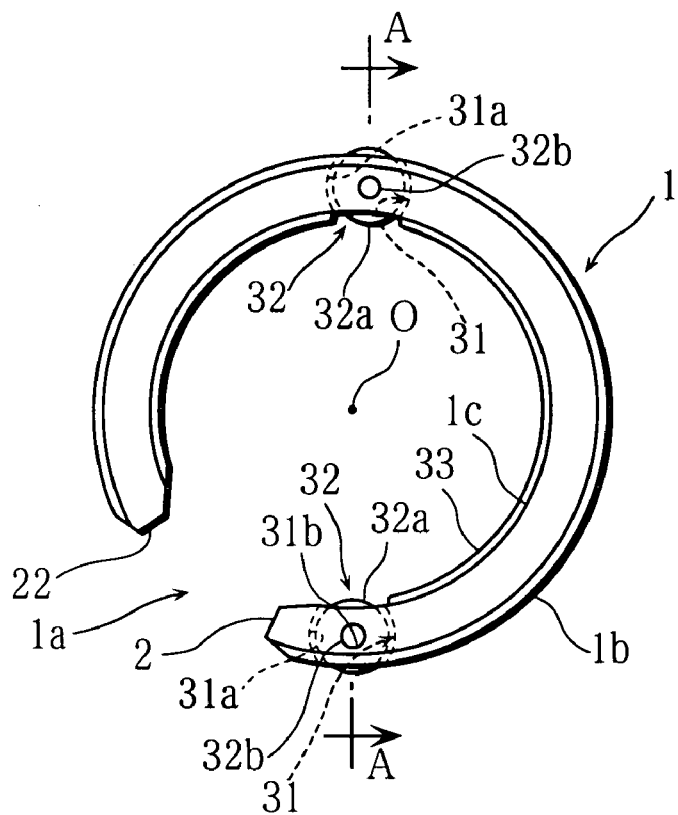
FIG. 3 is an enlarged front view showing a stop ring.
Figure 4:
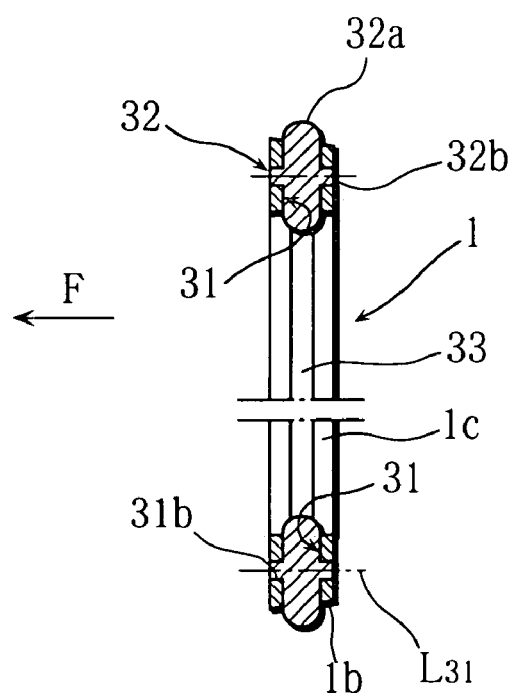
FIG. 4 is an enlarged cross-sectional view of A-A line in FIG. 3.
Figure 8:
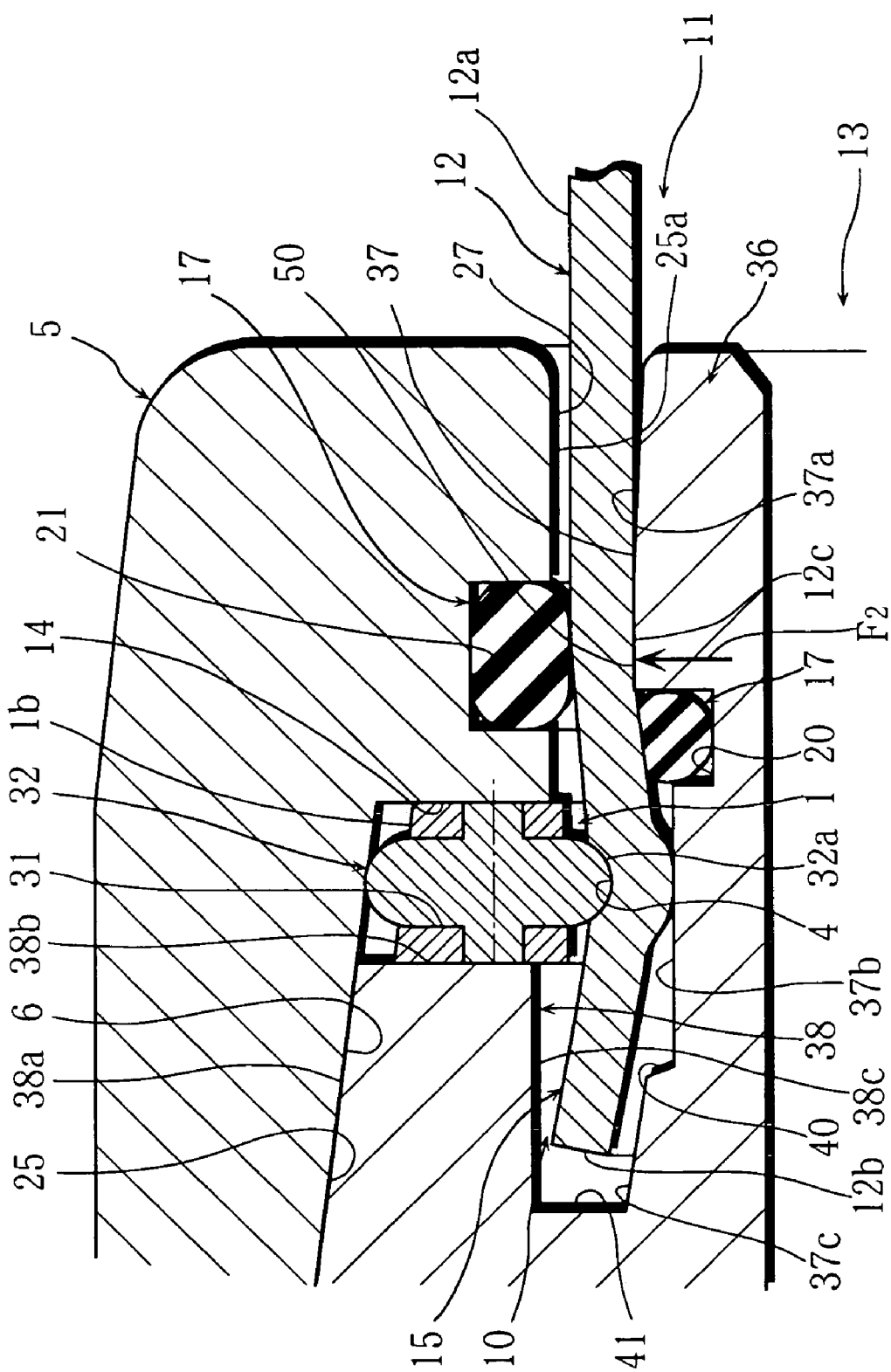
FIG. 8 is an enlarged cross-sectional side view of a principal portion.

Then, as shown in FIGS. 2, 8, and 9, the end portion 12b parts from the rotation-stopping tapered portion 37c of the insertion cylinder portion 36 and the hitching force $F_1$ reduces along with the deformation into the opening taper to release the rotation-stopping function on this portion. Before the parting, the inner peripheral face 12c of the pipe 12 is strongly pressed to a front peripheral end face 50 of the pipe insertion portion 37a of the insertion cylinder portion 36 by fastening of the rotator 32, and the inner peripheral face 12c of the pipe 12 receives hitching force shown with an arrow $F_2$ from the front peripheral end face 50.

As described above, as the cap nut 5 is screwed, the hitching force $F_2$ increases, and strong rotation-stopping function works on this portion.

Therefore, the pipe 12 is always prevented from rotating against the joint main body 13 from the beginning to the end of the screwing of the cap nut 5.

And, the pipe 12 smoothly diminishes in diameter by plastic deformation because the inner peripheral face 12c of the pipe 12 does not contact the insertion cylinder portion 36 for the peripheral groove 37b of the insertion cylinder portion 36 of the joint main body 13.

And, the end portion 12b of the pipe 12 is smoothly deformed into the tapered portion 15 without touching the inner peripheral face 38c because the gap 10 is formed between the end portion 12b of the pipe 12 and the inner peripheral face 38c of the outer-fitting cylinder portion 38.

The screwing described above may be conducted by hand or tool such as a pipe wrench.

Then, the screwing is completed when the cap nut 5 is thoroughly screwed into the joint main body 13. In this case, the hitching convex ridge 33 of the stop ring 1 fits into the concave groove 4 of the pipe 12 to hitch (refer to FIG. 9).

The pipe 12 is firmly connected to the pipe joint C without being drawn out by drawing force because the hitching convex ridge 33 (of rectangle inner peripheral end) certainly hitches to the concave groove 4, of which longitudinal cross section is half circular as to correspond to the disc portion 32a of the rotator 32, and the end portion 12b of the pipe 12 is deformed into the tapered portion 15.

And, the stop ring 1 contacts the rear end wall 14 of the tapered portion 6 of the cap nut 5 and does not slide against the joint main body 13 and the cap nut 5, and the pipe 12 does not suddenly slide against the pipe joint C in the axis L direction.

And, according to the stop ring 1 shown in FIG. 10, the concave groove 4 is certainly formed on the peripheral face 12a of the pipe 12, the stop ring 1 diminishes uniformly in diameter, and the screwing of the cap nut 5 is made very smooth because three rotators 32 contact the hole portion 25 of the cap nut 5 and the peripheral face 12a of the pipe 12.

To describe an operational example in FIGS. 11 and 12, the pipes 12 are inserted to the pair of the pipe joints C, the protection cover is attached to the mating end face 9 of the joint main body 13 and hit by a hammer to firmly hitch the pipe 12 to the rotation-stopping tapered portion 37c of the insertion cylinder portion 36 as described with FIGS. 1, 5, 6, and 7.

Then, the protection cover is removed, the mating end faces 9 of the joint main bodies 13A and 13B are made contact, and the outer brim portions 8 are held by the fastening ring body 7.

And, each of the cap nuts 5 is screwed for connecting the pipe 12 as not to fall out of the pipe joint C to complete the connection work. FIG. 11 shows a state in which only the cap nut 5 on one side (right side) is completely screwed.

Examination of the connection work was actually conducted with the pipe joint of the present invention. Fastening torque when the cap nut 5 (the stop ring 1) is fastened was measured as 350 to 430 (kg/cm).

And, pulling (drawing) prevention force of the pipe 12 in the pipe joint C after the connection is completed was about 62 (kN) which is converted to water pressure value of 215 to 235 (kg/cm²).

With the fastening torque above, lighter than that of the conventional pipe joint described in Japanese patent No. 3122385, the pipe joint is stably screwed and having twice or more durability against water pressure.

Next, operation method (function) of the pipe joint C shown in FIGS. 13 through 15 is described.

First, the stop ring 1 is disposed in the tapered portion 6 of the hole portion 25 of the cap nut 5, the pipe 12 is serially inserted to the insertion hole portion 27 of the cap nut 5, the inner peripheral face 1v of the stop ring 1, and the hole portion 3 of the joint main body 13, and, the end portion 12b of the pipe 12 is made contact the stopping staged portion 30 of the hole portion 3 of the joint main body 13 to make the state in FIG. 13.

And, the cap nut 5 is screwed to the joint main body 13 (rightward) in the arrow $M_5$ direction (refer to FIG. 6). As described in the function of FIGS. 1 through 9, the stop ring 1 rotates around the predetermined position of the pipe 12 in the arrow $M_1$ direction and gradually diminishes in diameter, and the rotator 32, rotating around the axis $L_{31}$, in the arrow $M_{32}$ direction, forms the circular concave groove 4 on the peripheral face 12a of the pipe 12 by plastic deformation.

Then, as shown in FIGS. 14 and 15, the cap nut 5 is screwed until the stop ring 1 contacts the peripheral staged portion 28 (formed on the front end of the insertion hole portion 27) of the cap nut 5 to complete screwing. In this case, the stop ring diminishes in diameter, and the hitching ridge portion 33 fits to the concave groove 4 of the pipe 12. Further, the stop ring 1 is strongly held by the staged portion 28 of the cap nut 5 and the rear end face 13a of the joint main body 13.

Therefore, the pipe 12 is firmly connected to the pipe joint C without being drawn out by the drawing force.

And, according to the stop ring 1 shown in FIGS. 16 and 17, the rotator 32 smoothly rotates without falling out of the stop ring 1, and the connection to the pipe 12 is conducted similarly to the stop ring 1 described above.

As described above, when the cap nut 5 is screwed to the joint main body 13, the stop ring 1 diminishes in diameter, and the hitching ridge portion 33 fits and certainly hitches to the concave groove 4 formed by the rotator 32 because the pipe joint relating to the present invention is provided with the joint main body 13 having the male screw portion 19, and the cap nut 5 screwed on the male screw portion 19, the C-shaped stop ring 1, having the opening 1a on periphery and disposed in the tapered portion 6 of the hole portion 25 of the cap nut 5, is provided, the stop ring 1 has the holding female portion 31 formed through the inner peripheral face 1c and the peripheral face 1b, the rotator 32, held as to rotate in the holding female portion 31, touching the tapered portion 6 of the hole portion 25 of the cap nut 5, and forming the peripheral concave groove 4 on the peripheral face 12a of the connected pipe 12 by plastic deformation, is provided, and the stop ring 1 has the hitching ridge portion 33 hitching to the peripheral concave groove 4 on the inner peripheral face 1c.

Therefore, the pipe 12 is certainly connected to the pipe joint, drawing prevention force is extremely large, and sudden falling after the connection is eliminated.

And, the rotational torque of the cap nut 5 is very low because the rotator 32 contacts the tapered portion 6 of the hole portion 25 of the cap nut 5 and rolls (rotates) in the screwing. Therefore, the stop ring 1 is easily fastened to the cap nut 5 without extra processes, and the connection work with screwing is conducted swiftly and smoothly.

And, the concave groove 4 is formed by plastic deformation, waste is not generated out of the pipe 12, the cap nut 5 is smoothly screwed, and pipings can be connected in various working sites with easy work.

And, the pipe joint relating to the present invention is provided with the joint main body 13 having the male screw portion 19, and the cap nut 5 screwed on the male screw portion 19, and, the joint main body 13 has the outer-fitting cylinder portion 38 and the insertion cylinder portion 36 holding the end portion 12b of the plastically-deformable connected pipe 12 from outside and inside, the C-shaped stop ring 1, having the opening 1a on periphery and disposed in the tapered portion 6 of the hole portion 25 of the cap nut 5, is provided, the stop ring 1 has the holding female portion 31 formed through the inner peripheral face 1c and the peripheral face 1b, the rotator 32, held as to rotate in the holding female portion 31, touching the tapered portion 6 of the hole portion 25 of the cap nut 5, forming the peripheral concave groove 4 on the peripheral face 12a of the pipe 12 by plastic deformation, and the end portion 12b of the pipe 12 into the opening tapered portion 15, is provided, the inner peripheral face 38c of the outer-fitting cylinder portion 38 forms the gap 10 with the end portion 12b of the pipe 12 as the end portion 12b is deformed into the tapered portion 15, and the peripheral face 37 of the insertion cylinder portion 36 has the peripheral groove 37b corresponding to the peripheral concave groove 4 to make the inner peripheral face 12c of the pipe 12 circularly diminish in diameter direction when the peripheral concave groove 4 is plastically deformed. By synergistic effect of these features, hitching force of the stop ring 1 hitching to the concave groove 4 of the pipe 12 is made very large.

Therefore, the pipe 12 is certainly connected to the pipe joint, drawing prevention force is extremely large, and sudden falling after the connection is eliminated.

And, the rotational torque of the cap nut 5 is very low because the rotator 32 contacts the tapered portion 6 of the hole portion 25 of the cap nut 5 and rolls (rotates) in the screwing of the cap nut 5.

Further, the end portion 12b of the pipe 12 does not contact the peripheral face 37 of the insertion cylinder portion 36 and the inner peripheral face 38c of the outer-fitting cylinder portion 38 from the beginning to the end of plastic deformation, and smoothly deforms into the tapered portion 15. The rotational torque of the cap nut 5 is reduced further thereby.

As described above, the connection work by screwing is conducted swiftly and smoothly.

And, the concave groove 4 is formed by plastic deformation, waste is not generated out of the pipe 12, the cap nut 5 is smoothly screwed, and pipings can be connected in various working sites with easy work.

The hitching force of the stop ring 1 hitching to the concave portion 4 of the pipe 12 becomes very large because the stop ring 1 has the hitching ridge portion 33 on the inner peripheral face 1c hitching to the peripheral concave groove 4, and the rotator 32 and the hitching ridge portion 33 fit into the concave groove 4 formed by plastic deformation on the pipe 12. Therefore, the drawing of the pipe 12 from the pipe joint is strongly restricted.

The water flowing through the pipe 12 is certainly prevented from leaking out of the insertion cylinder portion 36 because the circular holding groove portion 20 is formed on the peripheral face 37 of the insertion cylinder portion 36 of the joint main body 13, and the seal member 17 held in the holding groove portion 20 and touching the inner peripheral face 12c of the pipe 12. Further, when the cap nut is screwed, the rotator 32 fastens the pipe 12, the inner peripheral face 12c tightly fits to the seal member 17, and the water is prevented further from leaking out.

And, two pipes 12 as one pair can be easily and firmly connected because the pair of joint main bodies 13A and 13B having the outer brim portion 8 respectively, in each of which the flat mating end face 9 at right angles with the axis L of the pipe 12 is formed on the opposite side to the pipe insertion portion 11, and the detachably attached fastening ring body 7, having the fastening concave groove 44 to hold the outer brim portions 8 with the mating end faces 9 of the pair of joint main bodies 13A and 13B tightly fit each other, is provided.

And, the pipe joints can be attached and detached each other in the direction at right angles with the axis L, and, for example, it is easy to cut and replace a middle portion of the pipe with a new pipe.

While preferred embodiments of the present invention have been described in this specification, it is to be understood that the invention is illustrative and not restrictive, because various changes are possible within the spirit and indispensable features.

What is claimed is:

1. A pipe joint having a joint main body having a male screw portion, and a cap nut screwed on the male screw portion, comprising:

a C-shaped stop ring, having an opening on its periphery and disposed in a tapered portion of a hole portion of the cap nut;

a holding female portion formed though an inner peripheral face and a peripheral face of the C-shaped stop ring;

a rotator, held as to rotate in the holding female portion, touching the tapered portion of the hole portion of the cap nut, and forming a peripheral concave groove on a peripheral face of a connected pipe by plastic deformation; and a hitching ridge portion on the inner peripheral face of the stop ring hitching to the peripheral concave groove.

2. A pipe joint having a joint main body having a male screw portion, a cap nut screwed on the male screw portion, and an outer-fitting cylinder portion and an insertion cylinder portion on the joint main body for holding an end portion of a plastically-deformable connected pipe from outside and inside, comprising:

a C-shaped stop ring, having an opening on its periphery and disposed in a tapered portion of a hole portion of the cap nut;

a holding female portion formed through an inner peripheral face and a peripheral face of the C-shaped stop ring;

a rotator, held as to rotate in the holding female portion, touching the tapered portion of the hole portion of the cap nut, forming a peripheral concave groove on the peripheral face of the pipe by plastic deformation, and forcing the end portion of the pipe into an opening tapered portion;

an inner peripheral face on the outer-fitting cylinder portion for forming a gap with the end portion of the pipe as the end portion is deformed into the tapered portion; and a peripheral face on the insertion cylinder portion having a peripheral groove corresponding to the peripheral concave groove of the connected pipe for making an inner peripheral face of the pipe circularly diminish in the diameter direction when the peripheral concave groove is plastically deformed.

3. The pipe joint as set forth in claim 2, wherein the stop ring has a hitching ridge portion on the inner peripheral face hitching to the peripheral concave groove.

4. The pipe joint as set forth in claim 2 or claim 3, further comprising a circular holding groove portion formed on the peripheral face of the insertion cylinder portion of the joint main body, and a seal member, held within the holding groove portion and touching the inner peripheral face of the pipe.

5. The pipe joint as set forth in claim 1, 2 or 3, wherein a pair of the joint main bodies have an outer brim portion respectively, in each of which a flat mating end face at right angles with an axis of the pipe is formed on an opposite side to a pipe insertion portion, and there is further provided a detachably attached fastening ring body, having a fastening concave groove to hold the outer brim portions with the mating end faces of the pair of joint main bodies tightly fit to each other.

* * * * *